United States Patent Office 3,468,797
Patented Sept. 23, 1969

3,468,797
PICKLE LIQUOR DISPOSAL
Clyde B. Myers, Mentor, Ohio, assignor to Diamond Shamrock Corporation, Cleveland, Ohio, a corporation of Delaware
No Drawing. Filed Mar. 28, 1968, Ser. No. 717,041
Int. Cl. C02b 1/18
U.S. Cl. 210—42                                   2 Claims

ABSTRACT OF THE DISCLOSURE

Spent hydrochloric acid pickle liquors, especially those liquors which contain iron, may be disposed of in an efficient and economical manner by reacting these liquors with a waste material, which waste material is formed primarily from the discharge of an ammonia-soda plant. In this manner the iron is substantially completely removed from the liquor and therefore does not enter the surrounding watershed.

BACKGROUND OF THE INVENTION

It has long been known to use acid solutions of various concentrations to remove the surface film from a variety of metals. Of particular importance is the use of hydrochloric acid solutions to clean the surface of iron and steel. After the pickling solution has been in use for a period of time, its hydrochloric acid content will become depleted and the solution will contain a large amount of dissolved and suspended material, particularly ferrous chlorides. Since such a solution is no longer of use or commercial value it is necessary to dispose of the spent pickle liquor and replace it with a new batch of hydrochloric acid. Obviously, in view of the growing concern over the pollution of the country's water resources, these depleted liquors, which contain in most instances a small quantity of free acid as well as relatively large amounts of dissolved iron and other contaminants, cannot be merely introduced without treatment into natural bodies of water. Therefore a method of treating these liquors to remove both the acid values and the iron and other contaminants must be found.

One solution to this problem in the past has been to neutralize the depleted liquor with a basic compound, which neutralization results in the precipitation from solution of iron, generally in the form of ferrous hydroxide. This neutralization and precipitation, largely for reasons of economics, has generally been effected with calcium and magnesium oxides and/or carbonates. Thus, for example, large quantities of calcium oxide have been added to the spent pickle liquors, with agitation, followed by filtration to remove suspended and precipitated materials. Obviously, such a process has the disadvantage of being relatively uneconomical in nature as well as being somewhat cumbersome in that large quantities of the neutralizing compounds must be purchased and used and equipment must be on hand for the mixing and filtration operations. Furthermore this has been an essentially batch-type operation since filtration proceeds quite slowly in some instances due to the nature of the precipitate. Finally, the filtrate must be discharged and the filter cake disposed of in some manner.

Recently a number of somewhat more exotic techniques have been advanced for treating the spent pickle liquors with the object in mind of recovering the iron contained therein in a useful form. However, these procedures, which involve considerable amounts of expensive equipment, have been limited in use to plants of large size where the initial capital investment is not prohibitive. Furthermore, at this time most of these techniques are still in a experimental or pilot plant stage and therefore offer no immediate answer to the disposal problem.

STATEMENT OF THE INVENTION

Therefore, it is an object of this invention to provide an efficient and economical means for the disposal of spent hydrochloric acid pickle liquors.

It is a further object of this invention to provide a process for the disposal of iron-containing hydrochloric acid pickle liquors without the attendant contamination of naturally-occurring water with iron.

These and other objects of the invention will become apparent to those skilled in the art from the description and claims which follow.

It has now been found that spent hydrochloric acid pickle liquors, especially iron-containing hydrochloric acid pickle liquors, may be disposed of by contacting these liquors with a waste material, which waste material is formed essentially from the discharge of an ammonia-soda plant. If the liquor is then allowed to react with this body of waste material, and, if necessary, settle into separate solid and liquid components, the liquid eventually discharged will be relatively harmless, in terms of iron pollution and acid values, to the surrounding watershed.

DESCRIPTION OF THE PREFERRED EMBODIMENTS

Throughout the specification and claims the term "wastes" or "waste material" is used to describe the material with which the spent hydrochloric acid pickle liquors are contacted. These wastes are intended to refer to the material discharged from a typical ammonia-soda plant. While the actual composition of this waste discharge will vary depending upon the degree of efficiency with which the ammonia-soda plant is being operated, a typical range of analyses is presented on page 237 of Te-Pang Hou's "Manufacture of Soda," second edition.

It is the general practice in the industry to discharge these wastes, which may amount to as much as 5–6 million gallons per day, into a large open area known as a "waste lake." In this waste lake the solids settle out from the solution and the water either evaporates into the atmosphere or overflows from the waste lake into the surrounding watershed. After a period of time the waste lake will have reached its capacity to hold the solid discharge material and thus must be abandoned. While spent hydrochloric acid pickle liquors may be discharged into "active" waste lakes, or, indeed, reacted directly with the discharge stream, it is these abandoned waste lakes which may most advantageously be used in the practice of the present invention for reasons which will be apparent to those skilled in the art.

While it was in the past considered that these abandoned waste lakes were essentially useless, it has now been found that they may be efficiently and effectively utilized to dispose of spent pickle liquors, the disposal of which may be considered to be a significant and serious problem.

It will be understood by those skilled in the art that the terms "spent, or depleted, pickle liquor" and "spent iron-containing hydrochloric acid pickle liquors" encompass a variety of compositions and further that the exact composition is of little immediate significance in the practice of the present invention. Thus, while a "typical" spent pickle liquor may be considered to contain about 0.5% free HCl and approximately 100 grams per liter of iron, these quantities may vary widely depending upon their source and the reason for their disposal. Thus, on occasion it may be necessary to dispose of pickle liquors which as of yet contain relatively little, if any, iron. Conversely, on occasion the liquors may be considered to be completely "spent" in that little free acid is available and large quantities of iron are present. Obviously, the quantity of ammonia-soda plant waste material that would be consumed by these various pickle liquors will differ. This is a factor of little immediate importance, however, since the reaction or disposal will always take place in the presence of large excesses of alkaline materials.

As stated above, it has been found that if spent hydrochloric acid pickle liquors are introduced into a body of waste material formed from an ammonia-soda plant discharge stream, the free acid present in the pickle liquor will be neutralized and any iron present in the pickle liquor will be precipitated therefrom and will remain within the body of waste material while the aqueous portion of the pickle liquor proceeds into the surrounding water shed. It is thought to be surprising that large quantities of iron-containing pickle liquors may be introduced into a bed of essentially solid alkali waste material on a continuous basis and in an efficient manner. It would have been expected that the precipitation of iron as ferrous hydroxide within a body of waste solids would result in plugging of the pores and voids within the body of waste material and a consequent sealing off of the surrounding formation of waste materials from the introduced pickle liquor. This has not, however, been found to be the case in that very large quantities of spent pickle liquor may be introduced into a body of waste material without any apparent effect on the rate of its acceptance and neutralization.

A further surprising development is that it has been found that disposal of spent pickle liquors using the waste material from an ammonia-soda plant is much more efficient than when using synthetic waste materials of approximately comparable free and total calcium oxide content. Thus, for some unexplained reason the waste material from an ammonia-soda plant has a far greater capacity to remove iron from a depleted hydrochloric acid pickle liquor than does a supposedly comparable synthetic material.

From the above it will be seen that the advantage is obtained that no purchase of new equipment or additional chemicals is required according to the practice of the present invention in order to dispose of depleted liquors. Furthermore, in addition to the obvious and important advantage that pickle liquors may be efficiently disposed of without introducing iron contamination into the surrounding water shed, a novel method for reusing what were considered to be unusable areas of land, i.e., abandoned waste lakes from ammonia-soda plants, is provided. Therefore no new problems are created in locating new dumping areas for the disposal of the solid materials which are obtained by the neutralization of pickle liquors. There is also some evidence to the effect that the addition of these depleted liquors to the waste lakes results in a compaction of the solids in the waste lake bed, thereby presenting the possibility that these waste lakes may be used for the disposal of additional quantities of ammonia-soda plant discharges.

In order that those skilled in the art may more readily understand the practice of the present invention and certain specific embodiments by which it may be carried into effect, the following specific examples are afforded.

Example 1

Seven samples of pickle liquor each of which contain 5 grams of iron are prepared by diluting 50 milliliters of pickle liquor, containing 100 grams per liter of iron and having a free acid content of 0.5% HCl, to a total volume of 1000 milliliters. To each of these samples is added the quantity of reagent A–G indicated in Table 1.

TABLE 1

| Reagent | Total (gms.) CaO | Free (gm.) CaO | Initial Fe (gm./l) | Final Fe (gm./l) | Fe removed (Percent) | Filtration (min./500 ml.) | Sediment/250 ml. 1 hr. | Sediment/250 ml. 24 hr. |
|---|---|---|---|---|---|---|---|---|
| A | 13.5 | 0 | 5.0 | 4.67 | 6.6 | 1.2 | 11 | 11 |
| B | 13.5 | 0 | 5.0 | 4.77 | 4.6 | 3.0 | 17 | 17 |
| C | 15.5 | 2.6 | 5.0 | 0.325 | 93.5 | 1.5 | 48 | 47 |
| D | 12.0 | 12.0 | 5.0 | 0.001 | 99.98 | 42.0 | 216 | 118 |
| E | 13.5 | 2.9 | 5.0 | 2.0 | 60.0 | 17.0 | 70 | 44 |
| F | 13.5 | 2.9 | 5.0 | 2.0 | 60.0 | 18.0 | 72 | 46 |
| G | 13.5 | 2.9 | 5.0 | 1.78 | 64.4 | 13.0 | 78 | 54 |

A—NON-FER-AL, trademark of Diamond Shamrock Corp. for a high purity precipitated $CaCO_3$. B—ATOMITE, trademark of Thompson-Wyman for a ground limestone. C—Waste Lake (#3) Solids, Diamond Shamrock Corp. D—Pure CaO. E—NON-FER-AL plus pure CaO. F—ATOMITE plus pure CaO. G—Ultrafine precipitated calcium carbonate plus pure CaO.

It can readily be seen from the above table that reagent C, which consists of the waste solids from an ammonia-soda plant, is the most effective reagent for removing the iron from a pickle liquor solution. Only pure calcium oxide removes more iron from the solution and it can be seen that the precipitate obtained using pure calcium oxide requires 28 times as long to filter from solution than does the precipitate obtained with waste solids. Also, when let stand the precipitate obtained using pure calcium oxide settles out of solution much more slowly and the volume of total solids is considerably greater than that of precipitates obtained with the other reagents. It is surprising to note that none of the "synthetic wastes," i.e., reagents D–G, approach the ability of the ammonia-soda plant waste material to remove iron from solution. Furthermore, the filtration rates are slow and the precipitate and solids settle slowly from solution and, even though the quantity of iron precipitate is less in each instance, its volume even after 24 hours is substantially the same as that using the ammonia-soda plant waste solids. Obviously calcium carbonate alone, reagents A and B, is substantially completely ineffective for this purpose.

Example 2

As an example of the application of the instant invention on a commercially practical scale, the following is offered. A pit is dug 14 ft. x 28 ft. x 6 ft. deep into the surface of an abandoned waste lake. This waste lake occupies an area of approximately 120 acres, has an average waste deposit depth of 23.5 ft. and a solids content of 25%. Into this pit over a period of 48 weeks there is added a total of 1.3 million gallons of spent pickle liquor having varied free acid and contained iron contents. As much as 35,000 gallons have been added in one day. Throughout the duration of this test the ability of the deposit to accept the pickle liquor is not impeded by the precipitation of iron hydroxide. Core samples taken at the end of this period of time at a distance of up to 150 feet from the pit show traces of color due to the presence of precipitated iron compounds and indicate that the waste lake can continue to absorb and react with vast quantities of pickle liquor in an efficient and effective manner. Furthermore, no evidence is found to indicate that iron compounds in any form reach the surrounding watershed.

While the invention has been described with reference to certain preferred embodiments thereof it is not to be so limited since changes and alterations may be made therein which are within the scope of the appended claims.

I claim:

1. A method for the disposal of hydrochloric acid pickle liquors without the introduction of iron or acid into the surrounding watershed, which method comprises contacting said liquors with a waste material formed essentially from the alkali waste discharge of an ammonia-soda plant and allowing the liquor to react with said waste material whereby the iron present precipitates from solution and the acid values are neutralized.

2. A method for the disposal of spent iron-containing hydrochloric acid pickle liquors which method comprises introducing said liquors into a substantially solid body of waste material, said waste material being formed essentially from the alkali waste discharge of an ammonia-soda plant and being in the form of a abandoned waste lake, and allowing the liquors to react with said waste material whereby the iron present precipitates from solution and the acid values are neutralized.

References Cited

Greene, U. T., Ammonia-Soda Wastes and Their Disposal, Proc. Seventh Ind. Waste Conf., Purdue Univ., 1952, pp. 92–104.

Heise, L. W., et al., Practical Development Aspects of Waste Pickle Liquor Disposal, Proc. Thirteenth Ind. Waste Conf., Purdue Univ., 1958, pp. 140–150.

MICHAEL E. ROGERS, Primary Examiner

U.S. Cl. X.R.

23—200; 210—59